A. GUIGNARD AND F. ROSIGER.
TRACTOR SAFETY DEVICE.
APPLICATION FILED JUNE 2, 1920.
1,399,552.
Patented Dec. 6, 1921.
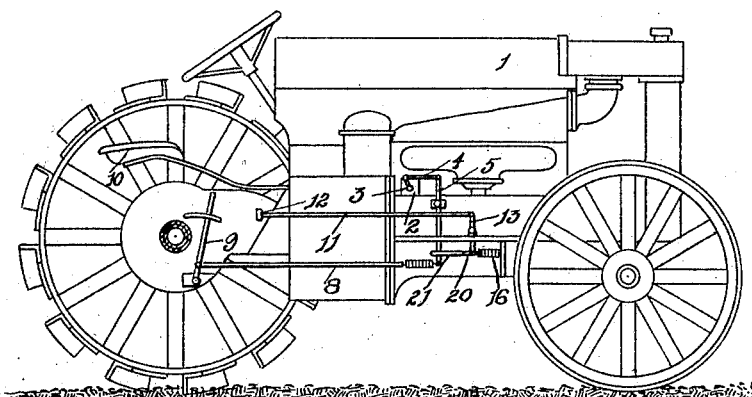
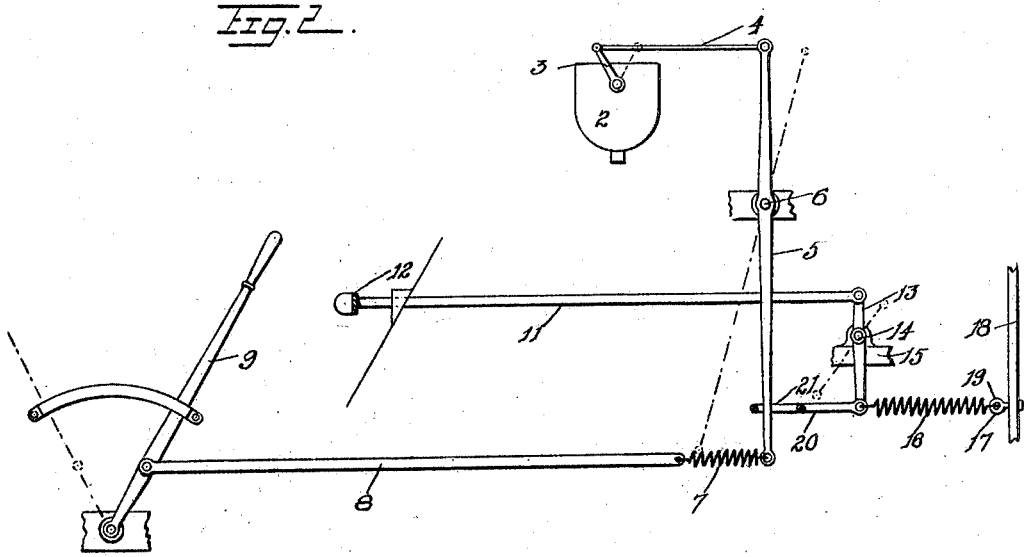
WITNESSES
INVENTORS
A. GUIGNARD
F. ROSIGER
BY
ATTORNEYS

UNITED STATES PATENT OFFICE.

AUGUST GUIGNARD AND FRED ROSIGER, OF HOOD RIVER, OREGON.

TRACTOR SAFETY DEVICE.

1,399,552.   Specification of Letters Patent.   Patented Dec. 6, 1921.

Application filed June 2, 1920. Serial No. 386,012.

*To all whom it may concern:*

Be it known that we, AUGUST GUIGNARD and FRED ROSIGER, both citizens of the United States, and residents of Hood River, in the county of Hood River and State of Oregon, have invented a new and Improved Tractor Safety Device, of which the following is a full, clear, and exact description.

This invention relates to improvements in tractor safety devices, an object of the invention being to provide an attachment for a tractor which is controlled by the operator so that in the event the operator is thrown from the seat of the tractor, and supply of gas will be either entirely or partially shut off to stop the tractor.

With tractors in ordinary use the lack of such a safety device is the source of great danger to the operator because it happens that, due to the condition of the ground or the engagement of the agricultural implements drawn by the tractor with some obstruction or rise in the ground, the operator is thrown from the seat. In such event, the tractor keeps on moving and the operator is liable to be killed or seriously injured by contact with the agricultural implements. To prevent any such possibility and to stop the tractor in the event the operator is thrown from or leaves the seat of the tractor, our invention was devised.

With these and other objects in view the invention consists in certain novel features of construction, and combinations and arrangements of parts, as will be more fully hereinafter described and pointed out in the claims.

In the accompanying drawings—

Figure 1 is a view in side elevation illustrating our invention applied to a type of tractor in ordinary use.

Fig. 2 is an enlarged diagrammatic elevation illustrating in detail our improved safety device in its coöperative relation with ordinary elements of the tractor.

1 represents a tractor which may be of any desired form and we would have it understood that our invention is adapted for use with any type of tractor. 2 represents the carbureter of the tractor, the flow of gas through the carbureter being controlled by a crank arm 3 connected by a link 4 with a lever 5, said lever pivotally supported between its ends as shown at 6.

The lower end of this lever 5 is connected by a spring 7 and link 8 with an operating lever 9, and while we have illustrated an ordinary type of hand lever, it is obvious that the invention is not limited to the particular form of lever mechanism controlling the operation of the gas supply for the tractor.

10 represents the operator's seat located usually at the rear of the tractor and in convenient position for operating the controlling means. Our improved safety device comprises a push rod 11 having a foot engaging plate or bracket 12 at one end in convenient reach of the operator on the seat 10. The forward end of this push rod 11 is connected to the upper end of a lever 13, the latter pivotally supported between its ends at 14 on a fixed part 15 of the tractor 1.

The lower end of the lever is connected by a forwardly projecting spring 16 with an eye 17 on a fixed part 18 of the tractor 1, and this spring 16 at its forward end is provided with a hook 19 which can be readily engaged or disengaged from the eye 17. A rearwardly projecting link 20 is pivotally connected to the lower end of the lever 13 and is provided with a loop or slot 21 through which the lower end of lever 5 projects, and this slot or loop 21 is of such a length as to permit of the ordinary operation of the lever 5 by means of its controlling lever 9 so that the operator can control the flow of gas in the ordinary manner.

In operation, before the operator can start the tractor, it is necessary for him to exert a forward push on the push rod 11 and this is done preferably by means of his foot pressing the plate or bracket 12. This movement of the push rod 11, through the medium of the lever 13, causes the link 20 to move rearwardly to a position which will permit the normal operation of the lever 5.

The operator must at all times during the movement of the tractor press the push rod 11 forwardly, and while we have referred to this operation as being performed by the foot of the operator, it is obvious that it might be performed in some other way without departing from our invention.

If the operator is thrown from the seat 10 or leaves the seat for any reason, the spring 16 will exert a forward pull on the link 20, drawing the link to the normal position shown in Fig. 2, and in this movement the link will operate to move the lever 5, link 4, and crank arm 3 to shut off or partially shut off the flow of gas to the engine of the tractor, thereby stopping the engine of the tractor, or allowing the same to run idly as may be desired.

While we have illustrated a particular form of operating means for shutting off or partially shutting off the flow of gas in the event the operator is thrown from the seat of the tractor, it is obvious that various modifications may be made in the mechanism to suit the particular type of tractor employed, and hence, we do not wish to limit ourselves to the precise details set forth, but consider ourselves at liberty to make such changes and alterations as fairly fall within the spirit and scope of the appended claims.

We claim:

1. The combination with a tractor, of a lever controlling the flow of gas to the engine of the tractor, a hand lever operatively connected to the gas controlling lever, a spring held member normally engaging the gas controlling lever to prevent its operation by the hand lever, and a foot operated device for holding said member in inoperative position.

2. The combination with a tractor, of a lever controlling the flow of gas to the engine of the tractor, a manually operated device controlling said lever, a link having a looped portion receiving the lever, a spring exerting a pull on the link normally holding the lever in position to cut off or partially cut off the flow of gas to the engine, a second lever pivotally supporting the link, and a push rod manually controlled by the operator of the tractor for moving the last-mentioned lever and maintaining the link in position to permit the normal operation of the first-mentioned lever.

AUGUST GUIGNARD.
FRED ROSIGER.